United States Patent [19]
Hardy et al.

[11] Patent Number: 5,964,414
[45] Date of Patent: Oct. 12, 1999

[54] HIGH PRESSURE LIQUID ROTARY NOZZLE WITH VISCOUS RETARDER

[75] Inventors: Scott W. Hardy; Douglas E. Wright, both of Durango, Colo.

[73] Assignee: StoneAge, Inc, Durango, Colo.

[21] Appl. No.: 09/071,387

[22] Filed: Apr. 30, 1998

[51] Int. Cl.[6] .................................................. B05B 3/06
[52] U.S. Cl. ........................................ 239/252; 384/462
[58] Field of Search ..................................... 239/251, 252; 384/462, 463, 613, 607, 606; 188/290, 327.5

[56] References Cited

U.S. PATENT DOCUMENTS

| | | | |
|---|---|---|---|
| 4,660,766 | 4/1987 | Nelson et al. | 239/322.17 |
| 5,503,334 | 4/1996 | Pacht | 239/251 |
| 5,531,380 | 7/1996 | Thompson, Sr. | 239/251 |

FOREIGN PATENT DOCUMENTS

| | | | |
|---|---|---|---|
| 2729451 | 1/1978 | Germany | 239/252 |

Primary Examiner—Andres Kashnikow
Assistant Examiner—Dinh Q. Nguyen
Attorney, Agent, or Firm—Kenton L. Freudenberg; Maxwell C. Freudenberg

[57] ABSTRACT

A small diameter high pressure liquid spray nozzle assembly has a small diameter elongated cylindrical body with a tubular nozzle shaft rotatably supported within the body. A stack of several identical radial ball bearings within a sealed bearing chamber in the body rotatably supports the shaft. The ball bearings are immersed in said chamber in a viscous liquid to provide viscous damping to retard speed of rotation of the nozzle shaft. A rotary high pressure liquid sealing assembly within the body between a high pressure liquid inlet to the body and an inlet to the shaft confine the flow of high pressure liquid to a flow passage within the body isolated from the interior of the bearing chamber. The viscous damping retardation is independent of the direction of the rotary nozzle shaft.

20 Claims, 3 Drawing Sheets

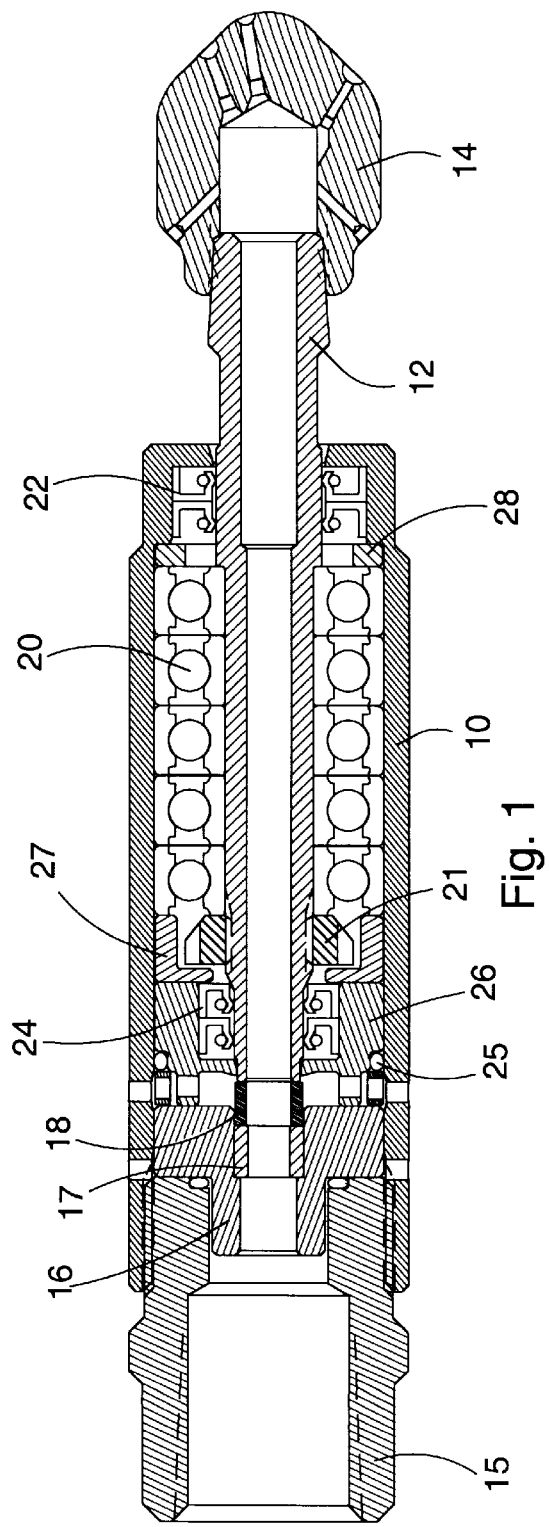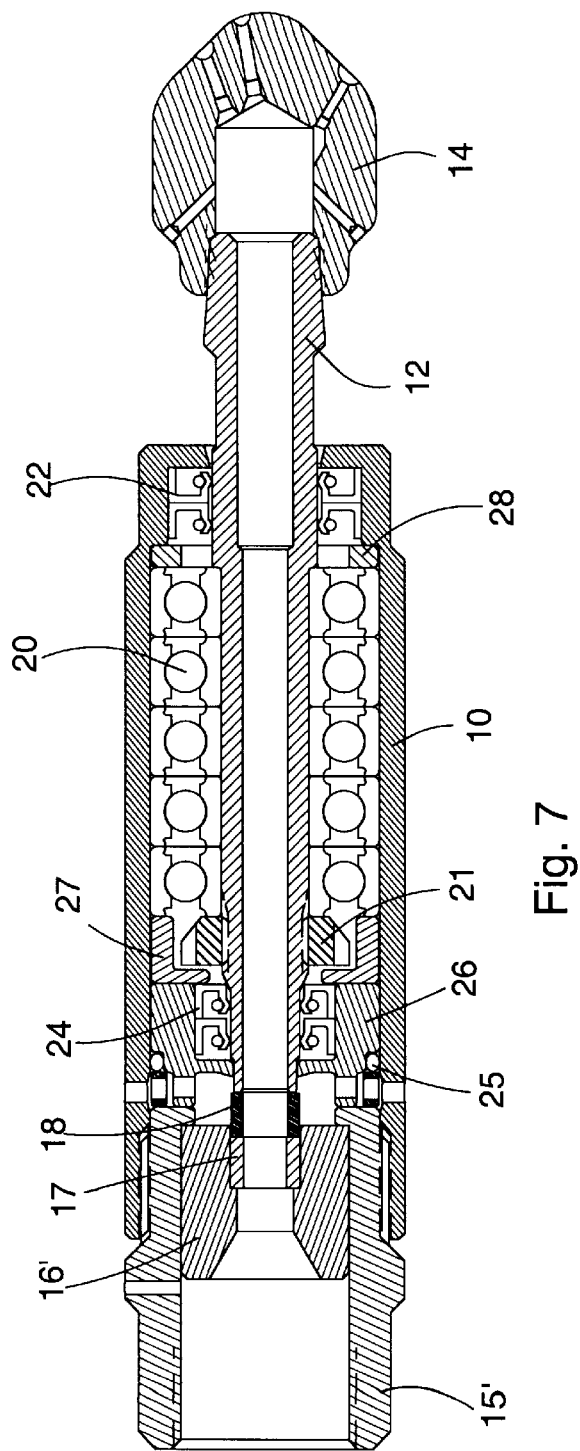

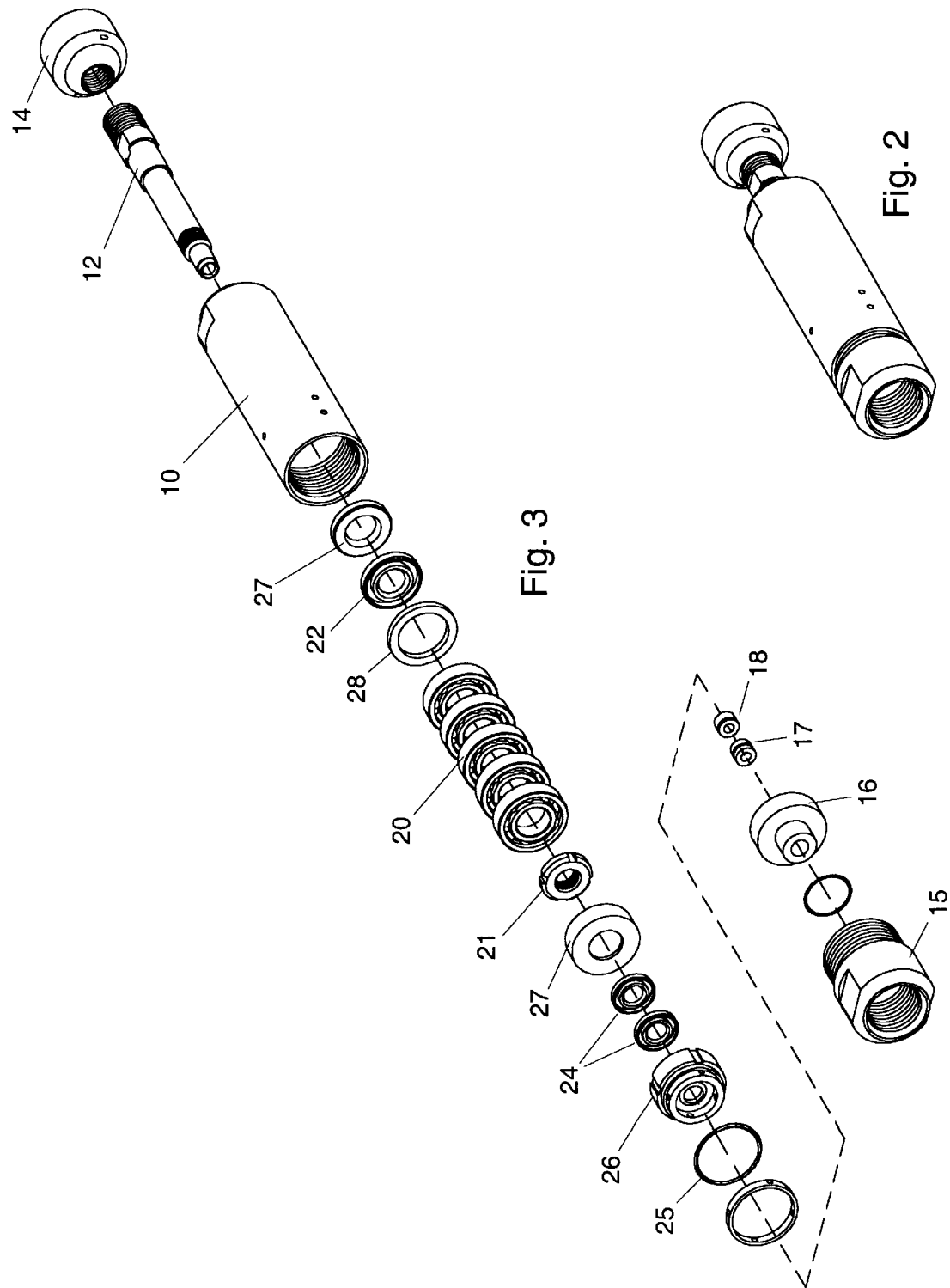

HIGH PRESSURE LIQUID ROTARY NOZZLE WITH VISCOUS RETARDER

This invention relates to a small rotary nozzle assembly for spraying high pressure liquids and having a rotary nozzle supported by a stack of ball bearings immersed in a viscous liquid as a rotary nozzle speed retarder.

BACKGROUND OF THE INVENTION

In the field of high pressure rotary liquid handling devices where the operating parameters can exceed 10,000 psi, rotating speeds of 1,500 rpm and flow rates of 25 gpm, construction, cost, durability and ease of maintenance of rotating small nozzles present many problems. Combined length and diameter of such nozzles may not exceed a few inches. The more extreme operating parameters and great reduction in size compound the problems. Pressure, temperature and wear factors affect durability and ease of maintenance and attendant cost, inconvenience and safety in use of such nozzle devices. Use of small metal parts such as springs, and poor quality of materials in such nozzles may result in their deterioration or breakage and related malfunctioning seals and jamming of small spray discharge orifices or the like especially when over-speeding of rotary parts is not controlled. Simple durable low cost and easily maintained speed controlled nozzles are most desirable.

SUMMARY OF THE INVENTION

Among the objects of the invention is to simplify the configuration of wearing parts of a small high pressure spray nozzle to reduce the number and cost and facilitate economical manufacture and replacement of the wearable parts.

Another object of the invention is to provide improved operation of rotatable high pressure nozzles by evenly distributing high internal thrust forces on a nozzle rotor, created by high pressure liquids in the nozzle, over several ball bearings supporting the rotor.

Another object of the invention is to help achieve a small durable light weight elongated and small diameter rotating high pressure spray nozzle assembly which can be conveniently carried on the end of a spray lance and readily inserted into small diameter tubes and the like to clean the same as well as being usable on other structures or large flat areas.

Another object of the invention is to provide a nozzle with speed retarding which is not dependent on direction of rotor rotation for its speed regulation.

Another object of the invention is to provide a durable rotation speed control mechanism for the rotating spray head in an elongated small diameter high pressure water spray assembly.

Another object of the invention is to provide an improved speed control mechanism for a rotating nozzle member of a small diameter high pressure spray nozzle assembly using a mechanism incorporating a viscous dampening fluid.

Another object of the invention is to provide an improved speed control mechanism for a rotating nozzle member of a small diameter high pressure spray nozzle assembly using an elongated bearing assembly having high thrust resistance and incorporating a viscous dampening fluid.

Another object of the invention is to provide improved temperature reduction in heat generating components of elongated small diameter high pressure water spray nozzle assemblies.

The high pressure nozzle of this invention is intended for use in a High Pressure (HP) range of approximately 5,000 to 30,000 psi. Thus the seal between a relatively stationary seal holder and the rotating inlet end of a nozzle tube must contain any selected pressure to be used. For a selected pressure, the flow rate and the orientation of the nozzle discharge tips provide the reactive force to rotate the nozzle. With a nozzle speed control means utilizing internal shearing of a viscous liquid in a protected speed control chamber to prevent overspeeding, the speed can be selectively kept in the range of about 100 to 1500 rpm for a spraying operation. However without speed control a runaway nozzle can achieve several thousand rpm which not only can detrimentally affect the spraying function but also rapidly increase wear of seals, bearings and other operating parts of the nozzle structure.

Several tandem or stacked radial ball bearings arranged face-to face form axially spaced load distributing bearing means between said shaft and said inner cylindrical surface of the housing body, rotatably support said shaft coaxially within the housing body, and prevent axial movement of the shaft when the shaft is subject to high forwardly directed thrust forces from internal high pressures at the rotary seal members in the nozzle assembly.

During assembly of several tandem or stacked radial ball bearings in the bearing chamber, the voids in and around the balls are completely filled and sealed with a non-pressurized viscous silicone liquid. After this chamber is sealed this viscous liquid produces a damping effect on the rotating shaft to restrain the speed at which the shaft rotates. Such speed control can be selected by the viscosity of the viscous liquid and physical configuration of the bearings and their races. The speed control is useful in governing the spray pattern from the spray head as the nozzle assembly is moved by its support relative to an object or surface being sprayed. Also the reduced rotational speed significantly reduces wear and heat generation at the moving parts within the nozzle assembly.

The nozzle structure comprises a generally cylindrical housing body containing a coaxial rotatable tubular shaft member having an input end in sealed relationship with a connecting high pressure liquid input member in the input end of the housing which has an internally threaded portion for receiving the end of a nozzle supporting lance or other means (not shown) for supplying the spray liquid to the spray nozzle.

Between the nozzle input member and the input end of the shaft is a high pressure sealing assembly forming a passage for confining high pressure liquid being transferred to the nozzle and comprising a stationary annular seal holder opposite to the end of the shaft for supporting annular seal components having inner diameters corresponding to the inner diameter of the input end of the shaft. The seal holder is counterbored to provide a stepped annular recess with a smooth cylindrical wall coaxial with the shaft and containing a plastic annular cylindrical seal member and an annular cylindrical carbide wear resistant hard sealing ring seat which is held between the plastic seal and the end of the shaft when high pressure liquid flows through the nozzle during its spraying operation. The carbide seat is kept coaxial with the shaft by the stepped recess and its forward end projects beyond the recess into sealing engagement with the end of the shaft. The outside wall of the plastic seal fits snugly against the wall of the stepped recess and has an O-ring seal in a longitudinally-central groove between the plastic seal and the wall of the stepped recess to provide additional sealing means therebetween and hold the plastic seal in position against rotation and against the carbide seat as the latter is held against the shaft by pressure of the spray liquid on the plastic seal and rotates with the shaft during operation of the nozzle. As the end of the plastic seal wears where it contacts the carbide seat, liquid pressure on the plastic seal will push it forwardly along the stepped recess to assure continuity of the sealing assembly at the input end of the shaft.

Stacking of several small diameter radial ball bearings having inner and outer races and ball cages, in a damping chamber filled with viscous liquid, and the use of a durable rotary sealing arrangement permit a greatly reduced nozzle size and produce a nozzle of high durability under high pressure liquid spraying operations.

The seal contains the high working pressure of the spray liquid and prevents escape of high pressure liquid from the intended liquid flow path passage into the inlet end of the tubular nozzle member. The seal is made of an extrusion-resistant cross-linked ultra-high molecular weight polyethylene. The additional softer sealing member is preferably an O-ring of resilient tough heat-resistant elastomeric material held in a groove of rectangular cross section machined in the outer cylindrical surface of the seal member midway along its length. When the end of the seal member engaging the inlet end of the seat wears down to near the O-ring groove, the seal can be removed and the seal member reversed and used until the other end of the seal member becomes similarly worn.

The seal used permits easy replacement of a single seal with O-ring when it is worn at a small fraction of the cost of replacement of the carbide seat.

The sealing assembly comprises the seal holder, the plastic seal and the carbide seat. This provides a very effective seal at low cost because of the simplicity of configuration of these three principal parts and their manner of retention, and replacement when necessary after wear, during the life of the nozzle structure. Wear of 50% of the plastic seal is tolerated without degradation of sealing by this assembly.

The rotational speed control means for the spray nozzle is contained in a sealed chamber which encloses the ball bearing means for rotatably supporting the rotatable tubular member which carries the spray liquid to the nozzle spray head. This chamber is sealed to protect the bearing and speed control mechanisms from any spray liquid which might escape from the spray liquid passages within the nozzle housing.

The sealed bearing-enclosing chamber has an annular forward end seal between the outer surface of the shaft and a necked portion of the forward end of the housing. The rear end of the chamber is sealed by an annular metal ring between the shaft and the housing with a first O-ring seal between the ring and the inner wall of the housing and a shaft seal retained in a coaxial cup-shaped recess at the center of the ring between the ring and the rotatable shaft.

The various internal elements of the nozzle assembly in the inner confines of the nozzle assembly sealed bearing chamber including the forwardmost ball bearing and the rearwardmost ball bearing are kept in relatively fixed axial positions by a clamping arrangement which pushes all such elements toward the forward end of the housing where the foremost element abuts an inwardly extending housing shoulder.

DESCRIPTION OF THE DRAWINGS

FIG. 1 is a longitudinal section of a high pressure liquid spray nozzle apparatus using for nozzle rotor speed control a viscous liquid in a sealed chamber containing several stacked radial ball bearings immersed in the viscous liquid.

FIG. 2 is a perspective view of the nozzle apparatus of FIG. 1 from its inlet end.

FIG. 3 is an perspective exploded view of the nozzle apparatus of FIG. 2.

FIG. 7 is a view similar to FIG. 1 of another similar nozzle apparatus but with a different high pressure seal having slide out seal components which can be inspected and replaced without disturbing the integrity of the bearings and viscous liquid in the bearing chamber.

DESCRIPTION OF THE PREFERRED EMBODIMENT

Figure 4:
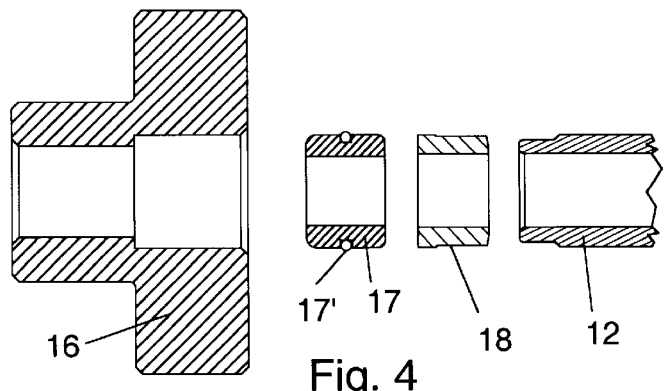
FIG. 4 is an enlarged exploded view of the preferred embodiment of high pressure seal components used in the nozzle of FIG 1.

FIG. 1 shows a high pressure liquid nozzle apparatus assembly having an elongated cylindrical nozzle housing body 10 within which is rotatably mounted a coaxial hollow shaft 12 which carries high pressure liquid to a discharge spray head 14 at one end of the body 10. The nozzle means on the forward end of the rotating shaft provides multiple jet streams of the liquid for cleaning purposes with the streams oriented to provide a jet reaction torque on the shaft to make it self-rotating.

High pressure liquid is supplied to the inlet end of the shaft 12 by inlet means comprising an inlet nut 15 which is internally threaded to connect to a source of high pressure liquid (not shown). The inlet nut 15 clamps in place a seal holder 16 within the housing body 10. The seal holder 16 has a stepped coaxial passage presenting a smooth inner cylindrical surface within which are coaxially supported in end-to-end relationship an annular cylindrical deformable seal member 17 and an annular cylindrical rigid seat 18 which is held solely by high liquid pressure on the seal member 17 and on the seat to force the seat against the inlet end of the shaft 12. The sealing seat member 18 has a first end face beveled at its outer edge and abutting the shaft with an area of contact smaller than an area where its opposite end face abuts the seal member 17 whereby the pressure differential across the seat 18 due to the high pressure liquid in said inlet passage maintains a net force holding the seat 18 against the shaft during operation of the apparatus.

As seen most clearly in FIG. 4 the seal member 17 has an elastomeric O-ring 17' in a central circumferential groove in its outer surface. The seal member 17 is made of hard strong wear resistant deformable extrusion-resistant material such as a cross linked ultra-high molecular weight polyethylene.

The seal components comprising the seal holder 16, the deformable seal member and the carbide seat form a high pressure liquid sealing means within said housing body for confining high pressure liquid flow between said inlet connection 15 to the housing body 10 and the inlet end of the shaft to a flow passage within said housing body which is isolated from the interior of the bearing chamber.

The shaft is rotatably supported in the housing body 10 by means of a stack of several abutting coaxial tandem dual-race radial ball bearings 20. These bearings have relatively moveable parts comprising balls and inner and outer races, and also preferably have as further relatively moveable parts ball cages to increase the internal shearing of viscous fluid by further interaction therewith by the cages in the vicinity of the balls. The preferred embodiment in FIG. 1 has five coaxial stacked ball bearing elements 20 which abut one another and which equally share the forward axial thrusts on the rotary shaft create by high pressure liquid flowing within the nozzle assembly. Each ball bearing element has two opposite parallel faces with the inner and outer races at each face having flat coplanar surfaces perpendicular to the longitudinal axis of shaft rotation. The adjacent coplanar surfaces of each adjacent pair of ball bearings are in abutment.

The inner races of ball bearings 20 are clamped together against a shoulder on the shaft by an inner race retainer 21 screwed on the shaft near its inlet end. The bearings are sealed in and extend along an elongated chamber between the shaft 12 and the body 10. Ends of this chamber are defined adjacent the ends of the stack of ball bearings 20 by means of a front shaft seal 22 between the shaft 12 and the body 10 and a rear shaft seal 24 engaging the shaft and supported within an annular seal sleeve ring 26 and held in the sleeve 26 by a rear seal retainer 27. Further sealing of the chamber to isolate it from other areas of high pressure liquid flow within the housing body is achieved by the O-ring 25 around the sleeve 26. The outer races of the bearings 20 are clamped together against a front shaft seal retainer 28 which abuts an inner annular shoulder near the front of the body 10. This clamping is achieved during assembly when a forward face of the inlet nut 15 is screwed tightly into the body 10 and against a stack of components including seal holder 16, the seal sleeve 26 and the rear seal retainer 27. The length of the stack of ball bearing elements 20 is at least 70 per cent of the length of the bearing chamber, and the length of the bearing stack is greater than 20 per cent of the overall length of the spray nozzle assembly.

During assembly of the nozzle apparatus the bearing chamber is filled to immerse the bearings in a viscous liquid which is subject to shearing forces by the relatively moving parts of the ball bearing elements 20 and other relatively moving surfaces within the bearing chamber. Speed control is maintained by internal viscous shear.

The viscous liquid may have different viscosities over a range including 500, 2,000 or 12,500 centistokes. Using a viscosity of 2,000 centistokes a shaft rotation speed can be achieved in the range of 1,000 to 1,500 rpm. Using a viscosity of 12,500 centistokes a shaft rotation speed can be achieved in the range of 300 to 500 rpm. The viscous liquid may be a silicone material. A suitable viscous material is polydimethylsiloxane (inhibited) available under a product designation L-405 from OSI Specialties, Inc., in Danbury Conn.

It is desirable to insure that the torque produced by the jets is within the operating limits of the tool. The preferred tool operational torque range is from 4 to 10 in-lb and it is generally desirable not to exceed 12 in-lb of torque.

The jet reaction force and nozzle orientation are designed to produce from 4 to 10 in-lb of torque based on pump size. Too small a torque may result in erratic rotation rates or be insufficient to start rotation. Too large a torque will exceed the ability of the tool to govern rotation speed and may cause heat buildup, temperature rise in the viscous liquid, rapid seal wear, and excessive rotation speeds. The tool should not generally be operated at torques above 12 in-lb.

The flow rating of the tool is 1.3 Cv. This means that at 25 gpm the pressure loss through the tool is 369 psi, while at 50 gpm the loss is 1482 psi.

Figure 5:
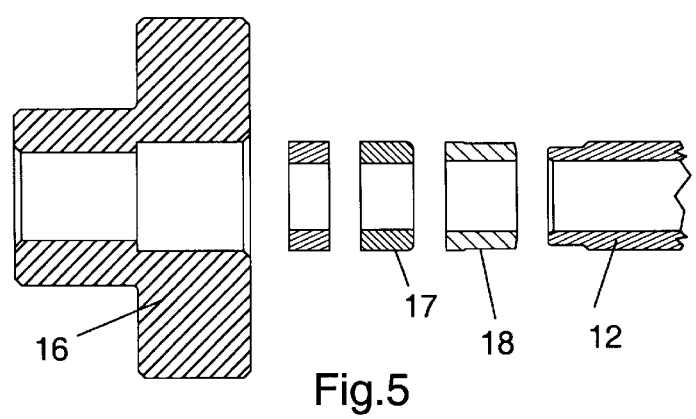
FIG. 5 is an enlarged exploded view of an alternative set of high pressure seal components usable in the nozzle of FIG. 1.
Figure 6:
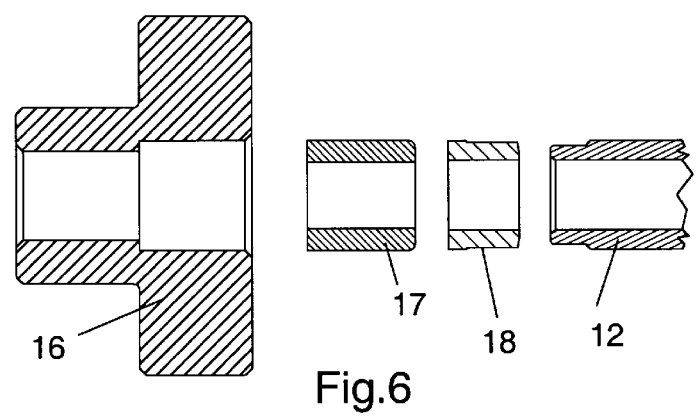
FIG. 6 is an enlarged exploded view of another alternative set of high pressure seal components usable in the nozzle of FIG. 1.
Figure 8:
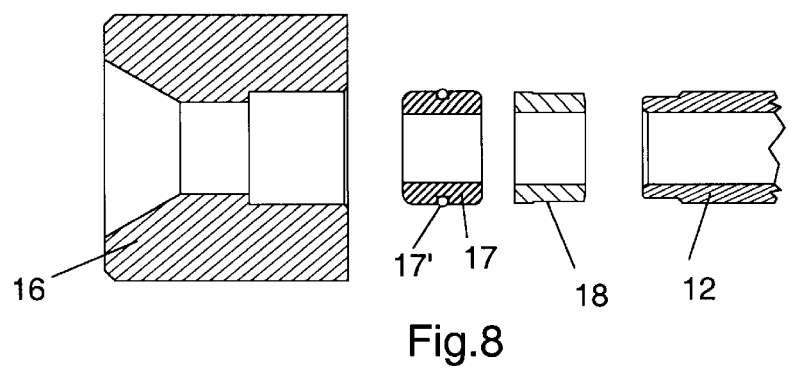
FIG. 8 is an enlarged exploded view of the high pressure seal components of FIG. 7.

In the sets of high pressure sealing components shown in FIGS. 4–6 the sealing seats 18 for sealing against the inlet end of the shaft 12 are identical, as are the seal holders 16.

In FIG. 4 the outside wall of the plastic seal 17 fits snugly against the wall of the stepped recess and has an O-ring seal 17' in a longitudinally-central groove between the plastic seal and the wall of the stepped recess to provide additional sealing means therebetween and hold the plastic seal in position against rotation and sealed against the carbide seat 18 as the latter is held against the shaft by pressure of the spray liquid on the plastic seal. The seat 18 rotates with the shaft during operation of the nozzle. As the end of the plastic seal 17 wears where it contacts the carbide seat, liquid pressure on the plastic seal will push it forwardly along the stepped recess of the seal holder 16 to assure continuity of the sealing assembly at the input end of the shaft. The importance of the O-ring 17' is to keep high pressure liquid from flowing or leaking around the outside of the plastic seal 17.

In the embodiment of FIG. 5, the O-ring is omitted but high pressure liquid is blocked from going outside of the seal by adding another softer annular cylindrical seal ahead or upstream to seal tightly against the stepped wall of the holder 16 and against the front surface of the seal 17.

Some applications of seals as described herein may be used on oscillating devices where the relative rotation of seal members at a sealing interface must be maintained under high loads created by high pressure liquids. The same sealing function is necesary whether the rotation of a tubular shaft member is continuous or oscillatory.

In the embodiment of FIG. 6, leakage around the seal 17 is minimized by inserting the seal 17 into the seal holder with a tight or press fit. It will still maintain a seal while traveling along the stepped wall of the holder as it wears during operation of the nozzle apparatus.

Specifications of FIG. 1 Embodiment

| | |
|---|---|
| Body diameter | 1¼ in. |
| Length overall | 6¾ in. |
| Weight | 1½ lb |
| Max pressure | 15,000 psi |
| Flow capacity | 25 gpm |
| Flow rating | 1.3 Cv |
| Rotation speed | |
| Slow | 300–500 rpm |
| Fast | 1,000–1,500 rpm |

Each radial bearing has a diameter of about 1.024 in. and a thickness of about 0.314 in. These bearings are each capable of supporting an axial thrust force on the shaft of 1000 pounds.

The small external size of the nozzle assembly enables it to pass through a 3 inch Schedule 40 long radius elbow.

The viscous liquid retarded nozzle apparatus of FIG. 7 differs from that of FIG. 1 in that the clamped radially outwardly extending flanges of the seal holder 16 are omitted, but the seal holder 16' is clamped in place against a portion of the inlet nut 15' by the attachment of a coupling on a high pressure liquid hose or lance threaded into the nut 15'. In FIG. 7 as shown, the seal holder 16', the seal 17 and the seat 18 are free to be withdrawn from the nozzle apparatus. Also, the holder 16' has a conical high pressure liquid entrance forwardly tapering to a short reduced diameter cylindrical orifice. Just forward of the orifice is the stepped smooth annular cylindrical seal supporting surface as described for FIG. 1.

A sealed swivel device for insertion into a high pressure liquid line may readily be made from the structure of FIG. 1 by merely connecting the inlet nut to the outlet of one high pressure liquid source line and replacing the spray head with a connection to the inlet of another line which feeds high pressure liquid to, for example, a nozzle apparatus like that of FIG. 1. The integrity of sealing achieved by the present invention is independent of direction and is thus well suited for swiveling in opposite directions. Such a swivel device where the shaft 12 would not continuously rotate with reference to the inlet nut 15 could help avoid twisting and tangling of lines when articulating or reeling them. When used as a mere swivel device, viscous liquid in the bearing chamber could be replaced with a lubricant of low viscosity and some of the middle bearings could be replaced with spacers or the body 10 could be shortened.

Other variations within the scope of this invention will be apparent from the described embodiments and it is intended that the present descriptions be illustrative of the inventive features encompassed by the appended claims.

What is claimed is:

1. A high pressure spray nozzle assembly comprising:
  a housing body,
  a tubular nozzle shaft rotatable within said body about an axis extending longitudinally of said shaft,
  said shaft having an inlet end and an outlet end,
  bearing means for rotatably supporting said shaft within the housing body,
  connecting means within said housing body for connecting a source of high pressure spray liquid to said nozzle assembly,
  high pressure liquid sealing means within said housing body for confining high pressure liquid flow between said connecting means and said inlet end of the shaft to a flow passage within said housing body,
  means defining an elongated sealed bearing chamber within said housing body isolated from said high pressure liquid flow passage and containing said bearing means,
  said bearing means having bearing parts in and along said chamber between and relatively movable with respect to said shaft and to said housing body and being immersed in said chamber in a viscous liquid and providing internal viscous liquid shear during operation of the spray nozzle assembly to retard rotation speed of the shaft to prevent over-speeding of the shaft relative to said housing body.

2. A high pressure spray nozzle assembly according to claim 1 wherein said bearing means includes a stack of several radial ball bearings equally sharing axial thrust exerted on said shaft within said housing body by high pressure liquid in said flow passage.

3. A high pressure spray nozzle assembly according to claim 2 and including a spray nozzle means on the outlet end of said shaft for providing cleaning jet streams of said high pressure liquid and self rotation of said shaft.

4. A high pressure spray nozzle assembly according to claim 3 wherein the length of said bearing stack is at least 70 percent of the length of the bearing chamber.

5. A high pressure spray nozzle assembly according to claim 3 wherein the length of said bearing stack is greater than 20 percent of the overall length of the spray nozzle assembly.

6. A high pressure spray nozzle assembly according to claim 2 wherein said viscous liquid has a viscosity in the range of 500 to 12,500 centistokes.

7. A high pressure spray nozzle assembly according to claim 2 wherein there are five ball bearings in said stack.

8. A high pressure spray nozzle assembly comprising:
  a housing body,
  a tubular nozzle shaft rotatable within said body about an axis extending longitudinally of said shaft,
  said shaft having an inlet end and an outlet end,
  bearing means for rotatably supporting said shaft within the housing body,
  said bearing means including a stack of several coaxial radial ball bearings with inner and outer races and means for clamping outer bearing races together in abutting relationship and to said housing body and means for clamping inner bearing races together in abutting relationship and to said shaft,
  connecting means within said housing body for connecting a source of high pressure spray liquid to said nozzle assembly,
  high pressure liquid sealing means within said housing body for confining high pressure liquid flow between said connecting means and said inlet end of the shaft to a flow passage within said housing body,
  means defining a sealed bearing chamber within said housing body isolated from said high pressure liquid flow passage and containing said bearing means,
  said bearing means being immersed in said chamber in a viscous liquid and providing internal viscous shear during operation of the spray nozzle assembly to retard rotation speed of the shaft to prevent over-speeding of the shaft.

9. A high pressure spray nozzle assembly according to claim 8 including spray nozzle means on the outlet end of said shaft with means for providing cleaning jet streams of said high pressure liquid and self rotation of said shaft.

10. A high pressure spray nozzle assembly according to claim 9 wherein axial reaction force on said shaft due to said jet streams of high pressure liquid is small compared to axial thrust on said bearing means by said shaft due to high pressure liquid forces on said shaft within said housing body externally of the bearing chamber.

11. A high pressure spray nozzle assembly according to claim 10 wherein said ball bearings share said axial thrust equally.

12. A high pressure spray nozzle assembly according to claim 8 wherein retardation of the shaft speed by said viscous liquid is independent of the direction of shaft rotation.

13. A high pressure spray-nozzle assembly according to claim 8 wherein the viscosity of said viscous liquid is about 2,000 centistokes providing a shaft rotation speed in the range of 1,000 to 1,500 rpm.

14. A high pressure spray nozzle assembly according to claim 8 wherein the viscosity of said viscous liquid is about 12,500 centistokes providing a shaft rotation speed in the range of 300 to 500 rpm.

15. A high pressure spray nozzle assembly comprising:
  a housing body,
  a tubular nozzle shaft rotatable within said body about an axis extending longitudinally of said shaft,
  said shaft having an inlet end and an outlet end,
  bearing means for rotatably supporting said shaft within the housing body,
  said bearing means including several equal load sharing radial ball bearing elements,
  each ball bearing element having two opposite parallel faces with the inner and outer races at each face having flat coplanar surfaces perpendicular to said axis of shaft rotation, connecting means within said housing body for connecting a source of high pressure spray liquid to said nozzle assembly, high pressure liquid sealing means within said housing body for confining high pressure liquid flow between said connecting means and said inlet end of the shaft to a flow passage within said housing body, means defining a sealed bearing chamber within said housing body isolated from said high pressure liquid flow passage and containing said bearing means, said bearing means being immersed in said chamber in a viscous liquid and providing internal viscous shear during operation of the spray nozzle assembly to retard rotation speed of the shaft to prevent over-speeding of the shaft.

16. A high pressure spray nozzle assembly according to claim 15 wherein adjacent coplanar surfaces of each adjacent pair of ball bearings are in abutment.

17. A high pressure spray nozzle assembly according to claim 15 wherein the means defining said sealed bearing chamber includes, at each end of said bearing means, rotating sealing means between said housing body and said shaft.

18. A high pressure spray nozzle assembly according to claim 15 wherein said housing body has a cylindrical portion around and coaxial with said bearing means and said high pressure liquid sealing means.

19. A high pressure spray nozzle assembly according to claim 18 wherein the cylindrical portion of the housing body is about 1.25 inches in diameter.

20. A high pressure spray nozzle assembly according to claim 15 wherein the external size of the nozzle assembly enables it to pass through a 3 inch Schedule 40 long radius elbow.

* * * * *